United States Patent [19]
Kempf

[11] Patent Number: 4,938,579
[45] Date of Patent: Jul. 3, 1990

[54] SIDE-VIEWING MIRROR DEVICE

[75] Inventor: Paul S. Kempf, P.O. Box 690, Solana Beach, Calif. 92075

[73] Assignees: Paul S. Kempf; Pilar Moreno Kempf Family Trust

[21] Appl. No.: 235,492

[22] Filed: Aug. 8, 1988

Related U.S. Application Data

[63] Continuation-in-part of Ser. No. 53,813, May 26, 1987, Pat. No. 4,795,237.

[51] Int. Cl.$^5$ .................................................. G02B 5/08
[52] U.S. Cl. ................................................... 350/640
[58] Field of Search .................... 350/640, 506, 631; 362/138, 139; D 16/130, 135; 248/466, 471

[56] References Cited

U.S. PATENT DOCUMENTS

| | | | |
|---|---|---|---|
| D. 279,131 | 6/1985 | McDaris | 350/640 |
| 761,273 | 5/1904 | Walker | 350/640 |
| 998,021 | 7/1911 | Marcy | 350/640 |
| 1,504,343 | 8/1924 | Heard | 350/640 |
| 1,750,194 | 3/1930 | Rydman | 350/640 |
| 1,909,853 | 5/1933 | Dalton | 350/640 |
| 2,140,005 | 12/1938 | Greenberg | 350/640 |
| 3,003,397 | 10/1961 | Jacobus | 350/640 |

Primary Examiner—Eugene R. Laroche
Assistant Examiner—R. D. Shafer
Attorney, Agent, or Firm—Brown, Martin, Haller & McClain

[57] ABSTRACT

A side-viewing mirror device particularly suitable for viewing objects such as components on printed circuit boards, comprises a mirror having at least one straight edge for placing against a flat surface and a reflective front surface extending up to the straight edge, and a handle member extending at an angle less than 90 degrees to the straight edge of the mirror, so that when the straight edge is positioned against a flat surface facing the side of an object to be viewed, while viewing the object from above, the handle member will be offset out of the plane of the optical path including the mirror.

24 Claims, 2 Drawing Sheets

SIDE-VIEWING MIRROR DEVICE

This application is a Continuation-In-Part of copending application Ser. No. 07/053,813 of the same Applicant, filed May 26, 1987, and entitled "OPTICAL INSPECTION METHOD WITH SIDE-VIEWING MIRROR."

BACKGROUND OF INVENTION

The present invention relates generally to an optical inspection apparatus for inspecting objects such as small components on printed circuit boards, and is particularly directed to a mirror for use with such an apparatus.

The inspection of complex components, such as are found on electronic printed circuit boards, is tedious and requires careful scrutiny by the operator. In standard inspection systems, the operator scans the top of a circuit board from above using a magnifying viewing system. An inspection apparatus of this type is described in my U.S. Pat. No. 4,379,647, entitled "OPTICAL COMPARATOR AND INSPECTION APPARATUS."

Normal inspection of a printed circuit board involves looking down on the top of the board. The connecting leads which project from the sides of the components can therefore be inspected. However, in order to save space on the board, components are now becoming much smaller with the development of so-called surface mount devices (SMDs), which are mounted very close to the board. The method of connecting these miniaturized components to the board has also been changed.

Soldering is accomplished by several methods, all designed to make the connection between the SMD component and the circuit board traces on the same side of the board as the component and to make the connection take up as small an area as possible In some cases, the component is cemented to the circuit board before soldering. In other cases, the component is held in place by solder paste for soldering. The solder is generally preprinted on the circuit board as a paste on solder pads on the board. Methods used to melt the preprinted solder include vapor phase, infrared and reflow techniques. However, in all of these techniques, problems such as solder spatter, failure to "wick," and thermal cracks can occur. Good visual inspection is required in order to locate such problems. Additionally, some components now employ so-called "J" leads which are tucked under the edge of the component, and thus cannot be inspected from above.

Standard inspection techniques for checking printed circuit boards involving looking straight down at the board, are often insufficient in the latest boards employing surface mount devices, especially with "J" type leads where the soldering cannot be seen by looking straight down. One way of observing such leads is by tilting the circuit board to try to look under the component. This is only partially successful, particularly where components are packed very close together on the board, and is difficult to do past 30 degrees. Most inspection techniques are of the scanning type, where a board moves under an optical viewing device, and any tilting of the board also makes it difficult for the viewer to keep track of inspected areas. Smaller circuit boards of 4 or 5 square inches in size, can be turned on edge to inspect at 90 degrees, but this only allows components at the edges of the board to be inspected, since other components will block the view of inner components. Larger printed circuit boards cannot be turned on edge in this way because of the physical restrictions of clearance and focal length of the optical viewing instruments.

On the larger PCB's, which cannot be tilted to 90 degrees on a standard viewing instrument, even hand tilted methods with an eye loupe are not possible past about 45 degrees. This is usually insufficient to verify the integrity of solder joints. Large PCB's are often inspected on programmable X-Y tables to permit computerized information on the location of errors. This technique almost eliminates the possibility of tilting the PCB, since this would change the inspection direction, and thus the location information would be difficult to track.

SUMMARY OF THE INVENTION

It is the object of the present invention to provide a device for aiding inspection of components on printed circuit boards and the like, which allows the top and sides of the components to be inspected.

According to the present invention, a side-viewing mirror device designed for use with an inspection apparatus for inspecting PCB's is provided. The side-viewing mirror device, according to the invention, comprises a front surface mirror having a reflective front surface and a non-reflective rear surface, and at least one straight edge for placing against the object plane, so that it can be placed with its edge contiguous to that plane with the mirrored front surface facing the side of a component on the board.

A handle is secured at one end to the mirror for allowing a user to position the mirror on a PCB at a suitable angle to the optical path of a viewing instrument. The handle extends at an angle less than 90 degrees to the straight edge of the mirror, so that when the edge is placed against the board the handle projects upwardly at an angle to the board for easy handling by a user. This allows easy manipulation of the mirror and also keeps the handle out of the plane of the optical path including the mirror.

In one embodiment, the mirror has a second straight edge at an angle of 90 degrees to the first edge and 45 degrees to the axis of the handle, extending on the opposite side of the handle axis to the first edge. This allows right or left handed use of the mirror. The first and second straight edges are preferably beveled to an angle of at least 45 degrees on the rear face of the mirror to allow the mirrored surface to be tilted while one of the edges remains in contact with the surface of the board, so that the edge of the mirrored surface is contiguous with the object plane at all angles of tilt.

In an alternative embodiment, the handle is secured to the mirror via a bent shaft or wire to allow the mirror to be inserted more easily in very small gaps between components. In this version, the mirror preferably comprises a thin strip-like member with elongate straight edges and is secured to the end of the handle shaft at an angle to the axis of the handle. As in the first embodiment, the rear surface of the mirror is beveled to an angle of at least 45 degrees adjacent the elongate bottom straight edge. The top straight edge can be used likewise when the wire is bent for left handed use. The free end is at 90 degrees to the elongate straight edges and may be used for oblique views (such as looking down a row) by placing it against the surface of the PCB.

BRIEF DESCRIPTION OF THE DRAWINGS

The present invention will be better understood from the following detailed description of some preferred embodiments of the invention, taken in conjunction with the accompanying drawings in which like references refer to like parts and in which.

DESCRIPTION OF THE PREFERRED EMBODIMENT

Figure 1:
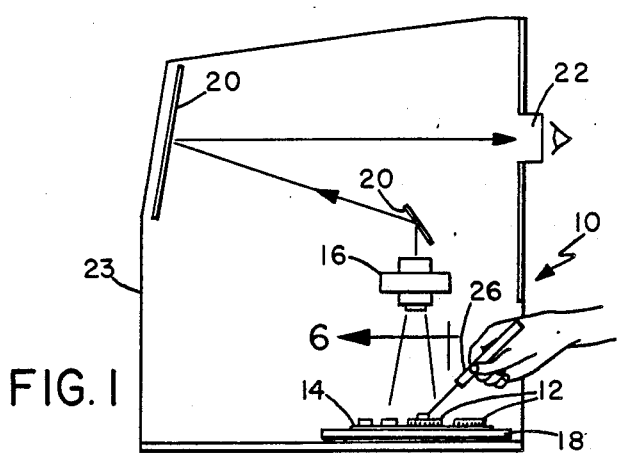
FIG. 1 illustrates schematically an optical inspection system employing a side-viewing mirror according to a first embodiment of the invention for simultaneous viewing of the top and side of an object.
Figure 2:
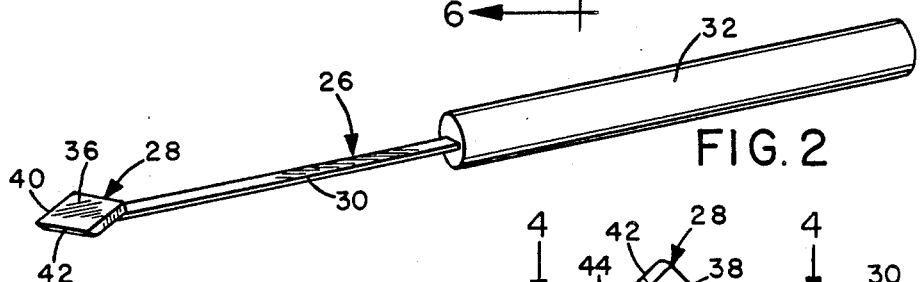
FIG. 2 is a perspective view of the mirror according to the first embodiment.
Figure 3:
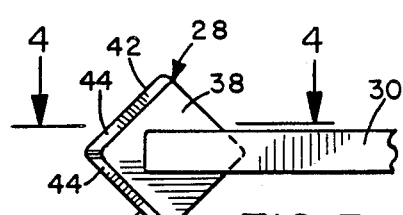
FIG. 3 is an enlarged underside view of the mirror head.
Figure 6:
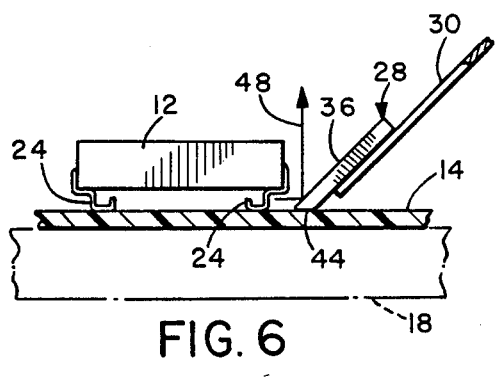
FIG. 6 is an enlarged sectional view taken on line 6—6 of FIG. 1.

FIG. 1 of the drawings illustrates an optical inspection system or apparatus 10 used to inspect components 12 on a printed circuit board 14. The apparatus 10 includes a magnifying optical device 16 directed downwardly towards board 14 which is supported on a platform 18, which may be movable to scan beneath the device 16. A magnified image of the top surface of the board 14 is directed from the device 16 via reflective surfaces 20 to an observer viewing the image through eyepiece 22. The device is typically enclosed in an outer housing 23, as illustrated in FIG. 1. This apparatus is of a standard type which allows PCB components to be viewed from the top only, so that the solder joints of components connected to the PCB, via so-called "J" leads 24 (see FIG. 6), are not visible. The method and apparatus of this invention allows inspection of components from any side, so that the area underneath a component mounted, as shown in FIG. 6, can be viewed. This method can be used with any PCB inspection technique, such as the apparatus shown schematically in FIG. 1.

FIGS. 2 to 5 of the drawings illustrate a first embodiment of the side-viewing mirror device 26, according to the invention. The mirror device 26 basically comprises a mirror 28 secured via a flat handle shaft 30 or a flexible cylindrical shaft (not shown) to a handle 32 of rounded or cylindrical shape at the opposite end for gripping by the operator, as shown in FIG. 1.

Figure 4:
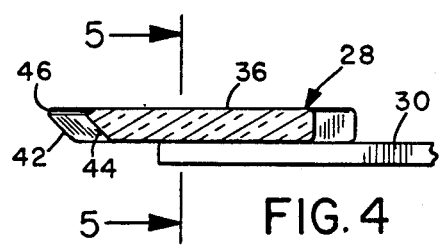
FIG. 4 is an enlarged sectional view taken on line 4—4 of FIG. 3.

The mirror 28 is preferably a first surface mirror having a front reflective surface 36 and a non-reflective rear surface 38. The handle shaft 30 is secured to the rear surface of the mirror, as shown in FIG. 4, with the mirror lying in the plane of the handle shaft. First and second straight bottom edges 40 and 42 are provided on the mirror at the extreme end of the device at an angle of 90 degrees to one another. Each surface 40 and 42 is canted at an angle of about 45 degrees to the axis of handle 32, and the surfaces project on opposite sides of the handle axis as shown. The mirror may be a rectangular shape, as shown in the drawings, or may be of triangular or other shapes accommodating the two straight bottom edges 40 and 42 at the extreme end of the device.

Figure 5:
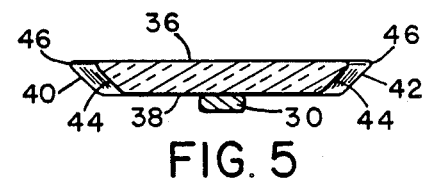
FIG. 5 is a sectional view taken on line 5—5 of FIG. 4.

The rear surface of the mirror is beveled at 44 adjacent the straight edges 40 and 42, as shown in FIGS. 4 and 5, with the bevel being at an angle of at least 45 degrees to the plane of the mirror. The bevels 44 are finished as smooth surfaces and are carried close to the front surface of the mirror, but leaving enough vertical edge or clearance 46 to avoid or restrict chipping problems, which a so-called "feather edge" may incur. The front surface of the mirror is preferably also lightly beveled at the straight edges 40 and 42 to restrict chipping.

The mirror is preferably made at the minimum practical thickness for handling without breaking easily, because of space limitations during inspection of small scale components on PCB's, as described in more detail below. In practice, the minimum thickness may be of the order of about 0.025 inches or less. The mirror is fastened to the handle by adhesive or the like, so as to minimize added thickness to the mirror. In the embodiment shown in FIGS. 2 to 7, the handle shaft 26 is flat so as to minimize thickness, but it could also be a thin flexible cylindrical rod such as plastic.

Figure 7:
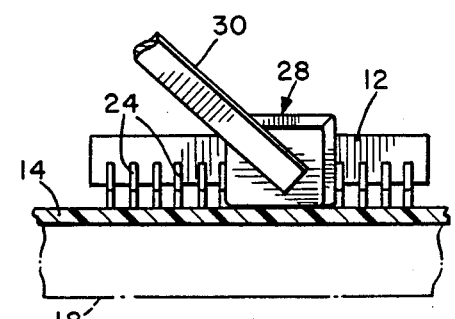
FIG. 7 is a side elevation view of the structure of FIG. 6.
Figure 8:
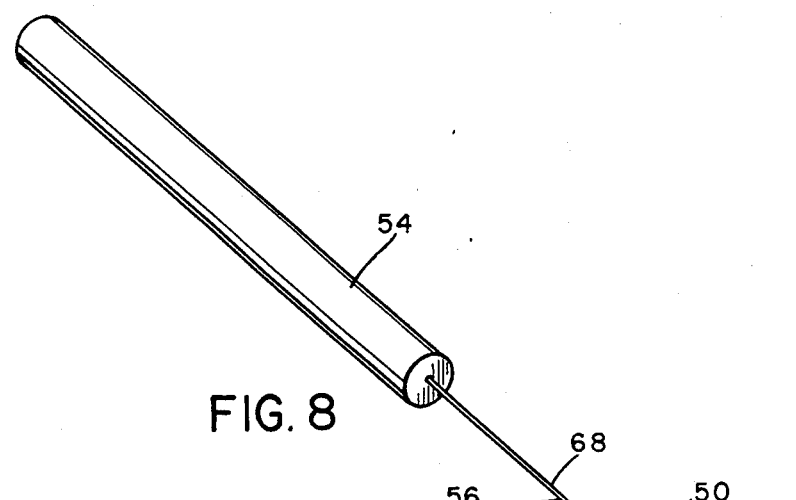
FIG. 8 is a perspective view of an alternative mirror configuration.
Figure 9:
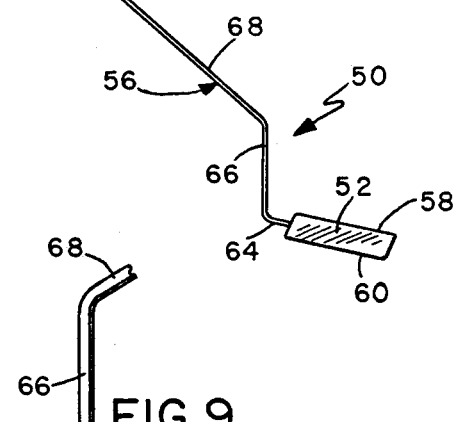
FIG. 9 is an enlarged rear elevation view of the mirror head of FIG. 8.

The use of the side-viewing mirror device 26 in an optical inspection system or method will now be described. With a system 10, as shown in FIG. 1, an operator will grip the rounded handle 32 as shown and position the first edge 40 of the mirror against the printed circuit board at the side of a component 12 closest to the operator with the reflective surface facing the object. The edge 40 may be touching or nearly touching the surface of the PCB. While viewing the object through eyepiece 22, the operator then tilts the mirror surface plus or minus 45 degrees from the vertical or optical axis 48 of the optical device 16 towards the operator, as illustrated in FIGS. 1 and 6. Since the handle axis is at about 45 degrees to the straight edge 40 when this edge is placed flat on the surface, the handle will project at about 45 degrees to the surface (see FIG. 1), which is the most comfortable orientation for the operator gripping the handle, and additionally projects out of the plane of the optical path and mirror, as shown in FIG. 7, so that it does not interfere with clear viewing of the image. The image in the optical magnifying instrument then shows both the normal "straight down" view of the component, and also the image of the side of the part rotated through approximately 90 degrees as seen in the mirror. Both images will be in focus simultaneously at their point of juncture.

The bevel 44 at the rear of the mirror adjacent edge 40 allows the mirror to be tilted while edge 40 remains at or close to contact with the board 14, as shown in FIG. 6. Since the mirrored surface extends up to edge 40, the operator sees a full view of the side of component 12 down to the level of the board. Thus, each J-lead solder connection can be inspected by sliding the mirror along the edge of the component. If the inspection system is of the scanning type, where board 14 moves on scanning platform 18 from left to right in FIG. 7, for example, the mirror is simply held at the appropriate angle adjacent a side edge of a component with its edge 40 parallel to the direction of movement of the board at or close to the board surface.

If the operator is left-handed, a similar technique is used with edge 42 placed against the board. The 45 degree offset of edges 40 and 42 to the axis of handle 28 allows for easy manipulation and also keeps the handle out of the optical path, as explained above.

If the operator wishes to focus further underneath a component 12, a focus adjustment of the downward facing lens in device 16 will permit an extended view beneath component 12 as far as desired. Angular viewing of more or less than 90 degrees to provide a different view of a particular solder connection, for example, is accomplished by simply tilting the mirror more or less than 45 degrees. In order to provide an oblique view, for example, to inspect the corner of an object, the mirror is rotated about the vertical axis to face the corner while tilting it relative to the optical axis as described above.

Once the side of a part closest to the observer has been examined, the other three sides can be inspected in a similar manner by placing the mirror in the path of the viewing instrument facing the appropriate side and tilting it, as shown in FIG. 6, to the appropriate angle. The provision of two perpendicular edges 40 and 42 not only facilitates manipulation of the mirror with the right or left hand, but also allows the mirror to be positioned easily to view any side of the part 12.

Figure 10:
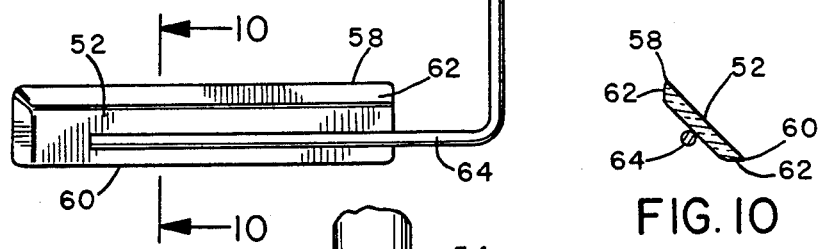
FIG. 10 is a sectional view taken on line 10—10 of FIG. 9.
Figure 11:
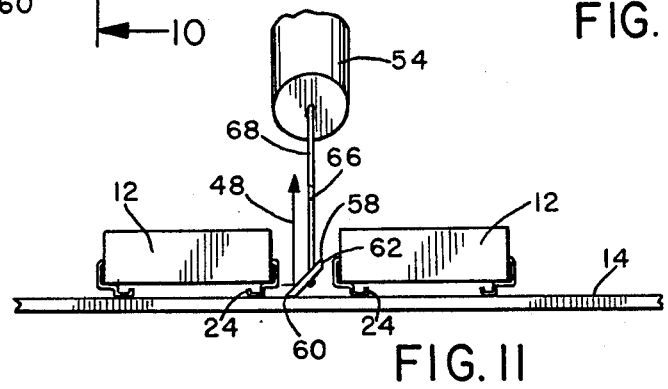
FIG. 11 is a side elevation view of a portion of a circuit board, showing the mirror in use between closely spaced components.

The 45 degree bevel 44 or the rear surface adjacent each edge 40 and 42, permits the mirror surface to be tilted while the edge remains essentially coincident or contiguous with the object plane or plane of the PCB, thus, extending the mirror surface as close to the board as possible. Frequently, the clearance between the component 12 and the PCB will be quite small and the bevel 44 allows a good underview, even with a very small clearance. As mentioned above, the mirror is made as thin as is practically possible because of the limited amount of space between components on PCB's. The mirror must be thin to permit the 45 degree angle needed for 90 degree viewing where the components are very close together FIGS. 8 to 11 of the drawings show an alternative configuration of the side-viewing mirror which is particularly suitable for use between components which are very close together, as illustrated in FIG. 11, and also where components are relatively tall. The mirror device 50 shown in FIGS. 8 to 11, basically comprises a thin, strip-like mirror 52 secured to a rounded handle 54 via bent wire shaft 56. The mirror in this embodiment also preferably comprises a front surface mirror with a reflective front surface and a non-reflective rear surface. The opposite elongate straight edges 58 and 60 of the mirror each have a beveled rear edge surface 62 as in the first embodiment, suitably at an angle of at least 45 degrees to the plane of the mirror so that either edge 58 or edge 60 can be placed in contact with the surface of a printed circuit board 14, as shown in FIG. 11, with the adjacent beveled surface resting against the board so that the reflective surface is tilted at an angle of 45 degrees to the optical path 48. The width of the mirror between edges 58 and 60 is suitably in the range from 0.015 to 0.120 inches, and the mirror is preferably made as thin as is practically possible, as in the first embodiment, and may be of the order of 0.010 to 0.030 inches thick.

As in the first embodiment, the handle 54 is a rounded elongate member for easy gripping by the user. A thin, bent wire shaft 56 projects from the handle and is secured to the mirror at its free end. The handle shaft has a first end portion 64 secured to the rear surface of the mirror, a second portion 66 bent at an angle of about 90 degrees to the first end portion, and a third portion 68 bent at an obtuse angle to the second portion 66 and secured coaxially to handle 54. Portion 68 is at an angle of about 45 degrees to the straight mirror edges 58 and 60. As best seen in FIGS. 10 and 11, the mirror 52 is secured to shaft portion 66 with its plane at an angle of about 45 degrees to the plane of the handle and shaft. The arrangement is such that when one of the edges 60 (or, alternatively, 58 in the left hand configuration) is placed against a flat surface, the second bent portion 66 will extend vertically upwards to avoid hitting any of the closely packed and relatively tall components, as indicated in FIG. 11, and the portion 68 and handle 54 will extend at about 45 degrees to the surface and out of the plane of the optical path and mirror, so that they do not interfere with viewing the device from above.

The mirror device 50 is used in a similar manner to the mirror of the first embodiment to reflect a side view of an object, such as an IC component, to an observer viewing the component from above via an optical instrument of the type generally used in inspecting PC boards. The mirror device is particularly useful on boards where ICs are placed in rows very close together so that there is less than ⅛ inch clearance between the parts. If the clearance is this small, the mirror device 26, shown in FIG. 2 to 5, could not be inserted between the parts and tilted to 45 degrees or more without hitting the parts. Thus, the mirror 50 is used in such cases with one of the edges 58 (left hand configuration) or 60 (right hand configuration) placed at or close to the board surface and adjacent beveled edge portion 62 lying on or close to the surface, as shown in FIG. 11. The opposite edges 58 or 60 allow either right or left handed manipulation of the mirror via handle 54. With the mirror edge 58 or 60 against the surface facing a side edge of a component 12, it will be automatically angled at 45 1 degrees to the vertical optical path of an overhead viewing instrument and the handle shaft portion 66 will extend vertically upwards between the parts to avoid hitting any ICs. Portion 68 and handle 54 will extend at 45 degrees to the board 14 for easy manipulation. The bevel 62 adjacent the upper edge 58 of the mirror in FIG. 11, provides additional back clearance to space the mirror from the component adjacent its rear surface. The mirror 50 may also be used "on end" with mirror edge 69 touching the PCB. This mode is particularly useful for viewing down rows of components. Edge 69 also has a beveled rear edge portion 70 to allow tilting of the mirror while holding edge 69 against the object plane.

The wire shaft 56 is extremely thin and will have some inherent flexibility. Thus, the mirror is effectively "spring-mounted" to the handle. This helps to hold the mirror firmly against the circuit board, steadying the image, and at the same time reduces the risk of chipping or damaging the very thin mirror as a result of applying too much pressure In each embodiment the handle axis is at an angle of about 45 degrees to the straight mirror edge, so that when that edge is placed against a flat surface the handle will project at 45 degrees to the surface for easy manipulation by the user. The straight mirror edges 40 and 42 in FIGS. 1 to 7, or edges 58 and 60 in FIGS. 8 to 11, and the bevels 44, 62 and 70 are ground to smooth surfaces in each embodiment of the mirror device to reduce the risk of scratching the PCB surface and its solder traces.

The side-viewing mirror device described above permits viewing of an object through an optical instrument from above and also at 90 degrees to that direction, while keeping both views in focus simultaneously. The object can be viewed from all sides with the mirror tilted at 45 degrees or at angles greater or less than 45 degrees for viewing at more or less than 90 degrees to the side. The mirror can also be used for oblique viewing by rotating it about the vertical axis. The second version of the mirror device can be used even when components are very closely packed to less than ⅛ inch clearance between the parts. The method of inspection described above can also be used in computerized fault location techniques, where PCBs are placed on X-Y scanning tables operated horizontally beneath an optical inspection apparatus, by suitably positioning the mirror to view the side edges of components as they scan past the mirror.

Although some preferred embodiments of the invention have been described above by way of example only, it will be understood by those skilled in the field that modifications may be made to the disclosed embodiments without departing from the scope of the invention, which is defined by the appended claims.

I claim:

1. A mirror device for use with a magnifying optical instrument to provide a side view of an object to be examined, the device comprising:
   a front surface mirror having a reflective front surface and a non-reflective rear surface, the mirror having a lower straight edge for placing against a flat surface and the reflective front surface extending up to the straight edge;
   an edge portion of the rear surface of the mirror adjacent the straight edge being beveled to maintain the straight edge in contact with an object plane when the plane of the mirror is inclined at an angle to the vertical; and
   a handle member having an elongate handle portion for gripping by a user at one end, and a shaft rigidly secured to the handle portion at one end and to the mirror at the opposite end with the axis of the handle portion being at an angle less than 90 degrees to the lower straight edge of the mirror, so that when the mirror is placed with its lower straight edge against a surface the handle portion projects upwardly at an angle to that surface.

2. The device as claimed in claim 1, wherein the straight edge is at an angle of 45 degrees to the axis of the handle portion.

3. The device as claimed in claim 1, wherein the mirror has two straight edges at its extreme end remote from the handle connection which are at 90 degrees to one another and each straight edge is inclined at the same angle to the handle axis.

4. The device as claimed in claim 3, wherein each straight edge is at an angle of 45 degrees to the handle axis.

5. The device as claimed in claim 1, wherein the beveled edge portion is inclined at an angle of at least 45 degrees to the plane of the mirror.

6. The device as claimed in claim 5, wherein the beveled edge portion is ground to a smooth surface.

7. The device as claimed in claim 1, wherein the handle portion is of rounded cross section and is elongated to provide a sufficient gripping length for supporting the mirror.

8. The device as claimed in claim 7, wherein the shaft comprises a flat member projecting from the handle portion, and the free end of the shaft is secured to a rear surface of the mirror with the mirror being co-planer with the shaft.

9. The device as claimed in claim 1, wherein the mirror has two straight edges at its end remote from the handle end at right angles to one another and lying on opposite sides of the handle axis at 45 degrees to the axis of the handle.

10. The device as claimed in claim 9, wherein the mirror has a non-reflective rear surface and edge portions of the rear surface adjacent the straight edges are beveled to allow the mirror to be tilted with either edge placed against a flat surface.

11. The device as claimed in claim 10, wherein the edge portions are beveled to an angle of at least 45 degrees to the plane of the mirror.

12. The device as claimed in claim 1, wherein the mirror is an elongate, planar strip having a reflective front surface and a non-reflective rear surface, the mirror having at least one elongate straight edge portion for placing against an object plane with the reflective surface of the mirror facing a side edge of an object.

13. The device as claimed in claim 12, wherein an edge portion of the rear surface of the mirror adjacent the straight edge is beveled.

14. The device as claimed in claim 12, wherein the mirror has opposite elongate straight edge portions for selectively placing against an object plane to allow right and left handed use of the device.

15. The device as claimed in claim 12, wherein the edge portions of the rear surface adjacent each straight edge are beveled to an angle of at least 45 degrees to the plane of the mirror.

16. The device as claimed in claim 12, wherein the mirror has a straight free end edge for selectively placing against an object plane while holding the mirror on end for oblique viewing.

17. The device as claimed in claim 1, wherein the shaft is a bent wire member.

18. The device as claimed in claim 1, wherein the shaft is resilient.

19. The device as claimed in claim 1, wherein the shaft is bent into a first end portion secured to the mirror, a second portion projecting substantially perpendicular to the straight edge of the mirror, and a third portion bent at an obtuse angle to the second portion and secured to the handle portion.

20. The device as claimed in claim 19, wherein the third portion is coaxial with the handle portion and at an angle of about 45 degrees to the straight edge of the mirror.

21. The device as claimed in claim 1, wherein the handle portion projects at an angle to the plane of the mirror.

22. A mirror device for use with a magnifying optical instrument to provide a side view of an object to be examined, the device comprising:
   a mirror comprising an elongate, planar strip member having a reflective front surface, a non-reflective rear surface and having opposite elongate straight edges for selectively placing against a flat surface, the reflective surface extending up to the elongate straight edges;

a handle member having an elongate handle portion for gripping by a user at one end, and a shaft secured to the handle portion at one end and to the mirror at the opposite end, the shaft being bent into a first end portion secured to the mirror, a second portion projecting substantially perpendicular to the straight edges of the mirror, and a third portion bent at an obtuse angle to the second portion and secured to the handle portion, the mirror being secured coaxially to the first end portion of the shaft with the plane of the mirror at an angle to the plane of the handle member.

23. A mirror device for use with a magnifying optical instrument to provide a side view of objects to be examined, the device comprising:

a mirror comprising an elongate, planar strip member having a length at least five times its width, the strip member having a reflective front surface and one elongate lower beveled edge for placing against a flat surface;

support means for positioning the mirror with its front surface at an angle of 45 degrees to the flat surface; and handle means for gripping by a user to position the mirror with its front surface facing the side edge of at least one object to be examined.

24. The device as claimed in claim 23, wherein the shortest width dimension of the mirror is in the range from 0.015 to 0.12 inches.

* * * * *